United States Patent [19]

Rivelli

[11] 3,950,632
[45] Apr. 13, 1976

[54] PROBE MOUNTING APPARATUS
[75] Inventor: Louis E. Rivelli, Shelton, Conn.
[73] Assignee: Food Automation-Service Techniques, Inc., Stratford, Conn.
[22] Filed: Apr. 14, 1975
[21] Appl. No.: 567,800

[52] U.S. Cl............... 219/523; 73/343 R; 99/342; 219/441; 219/442; 338/28
[51] Int. Cl.².......................................... H05B 3/06
[58] Field of Search .......... 219/523, 437, 441, 442; 73/362 AR, 343 R; 99/342; 338/28

[56] References Cited
UNITED STATES PATENTS

| | | | |
|---|---|---|---|
| 3,673,386 | 6/1972 | Drugmand et al. | 219/523 |
| 3,720,155 | 3/1973 | Fritzsche | 219/523 X |
| 3,866,472 | 2/1975 | Witt | 338/28 X |

Primary Examiner—C. L. Albritton
Attorney, Agent, or Firm—Haynes N. Johnson; Joseph L. Lazaroff

[57] ABSTRACT

A probe mounting apparatus adapted for use in the deep fat frying of French fries, fish, chicken and the like, wherein the length of cooking time is to be calculated by a timing computer responsive to the temperature of a predetermined portion of the cooking medium as sensed by a probe assembly including a stiff sleeve formed of a smooth surfaced metal and containing a temperature sensing element at its end. The probe assembly is repeatably and accurately attached to the fryer and immersed with its sensory element in a precise location in the cooking medium by means of a mounting apparatus comprising: a mounting block fixedly attached in a predetermined location on the fryer and having an opening therein, such as a slot, arranged to receive the probe sleeve and to define the position of the probe's longitudinal axis in the cooking medium. The block contains gripping means, such as releasable ball detents, to hold the probe sleeve in the block, and the longitudinal position of the probe sleeve in the block is fixed by means such as collars on the probe to accurately define the position of the temperature sensing element immersed in the cooking medium. The end of the sleeve is repeatably fixed in the predetermined portion of the cooking medium, thereby supplying uniform temperature data input to the computer despite repeated removal of the sleeve from the fryer for cleaning, and probe manufacturing and installation are simplified.

12 Claims, 5 Drawing Figures

U.S. Patent   April 13, 1976   3,950,632
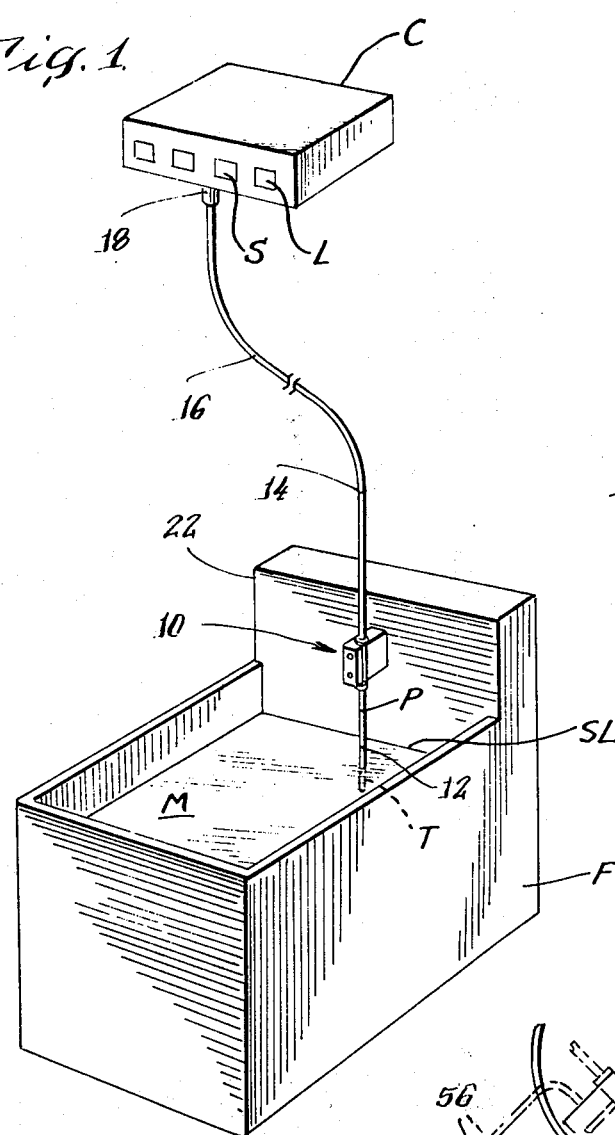
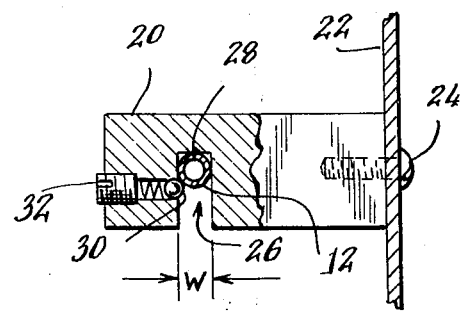
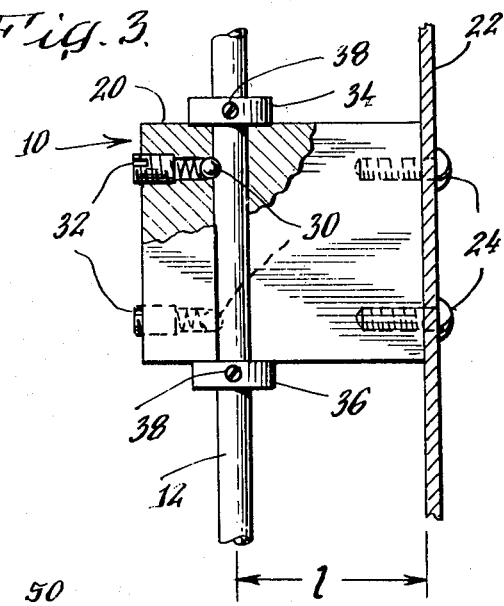
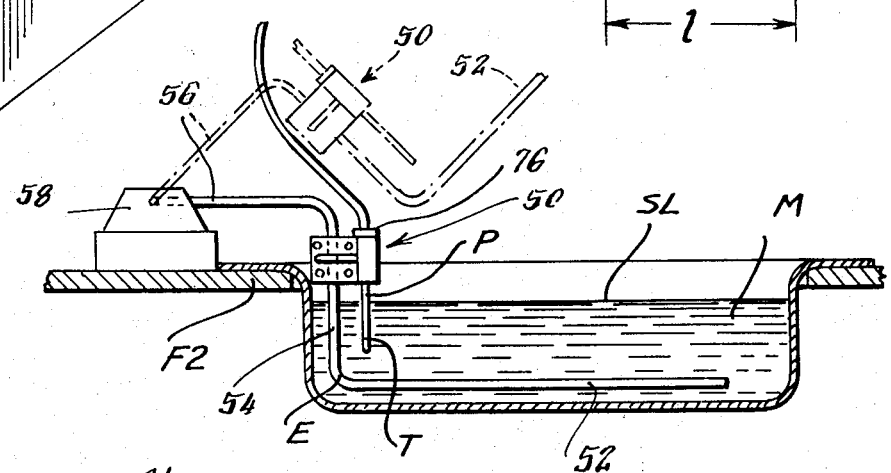
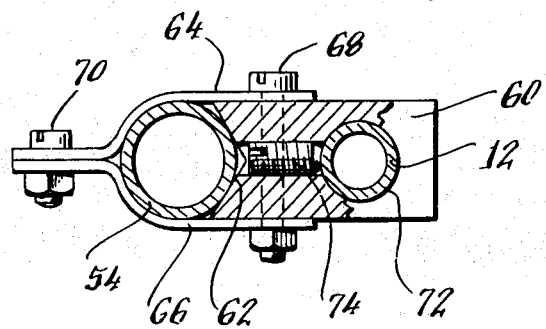

PROBE MOUNTING APPARATUS

BACKGROUND OF THE INVENTION

1. Field of the Invention

The field of the present invention relates to apparatus for mounting temperature sensitive probes used in a deep fat frying environment, the probe being mounted so that it is submerged in a predetermined location in the path of the cooking medium to supply temperature data as an input to a cooking timing computer which calculates the appropriate length of cooking cycle based on the temperature, and variations in temperature, of that particular location in the cooking medium.

2. Description of the Prior Art

Temperature-sensitive probes and their mounts, when intended for use in a deep fat frying environment and designed to supply a temperature data input to a timing computer, face many competing and conflicting design criteria. On the one hand, the probes should have a standard configuration so they can be mass produced, while on the other hand, they must be amenable to mounting upon a multitude of different fryers. Similarly, the probes must be easily removable from the cooking medium for cleaning, yet must always have their temperature sensing elements returned to the same location in the cooking medium to repeatably provide the correct temperature data input to the computer. For example, if a change in position of the probe results in a one degree variation in temperature data input to the computer, and the product being cooked is an average 10 pound load of chicken where the total temperature drop of the cooking medium may be only 10° during the 10 to 15 minute cooking period, the one degree variation in temperature measurement can result in as much as a 10 percent variation of cooking time.

The various probe mounting constructions known in the prior art have been unable to satisfy a significant number of these considerations. One known probe mount is a clip which secures the probe to the edge of the fryer, sacrificing the quality of data supply to the computer because the temperature near the side of the fryer varies considerably from the temperature where the product is cooked. Other rigid probe mounting structures hang the probe over the edge of the fryer with nothing to assist in relocating the probe for repeatable results. Other probe mounting arrangements use clamps which are difficult to unfasten and thereby inhibit the cleanability of the probe. Still other known probe mounting arrangements attain repeatability of positioning the probe by deforming the probe to match the fryer, which requires customizing of the probes to some extent.

SUMMARY OF THE INVENTION

Objects of the present invention are to provide an improved apparatus for mounting a probe to supply temperature data to a timing computer in a deep fat frying environment. It is a specific object of the invention to provide a probe mounting apparatus permitting the probe to be both easily removed from the fryer for cleaning and accurately repositioned in the cooking medium to provide a uniform temperature data input to the computer. Still another object of the invention is to provide a probe mounting apparatus permitting standard probes to be used on different fryers and thereby avoiding customizing problems.

In a preferred embodiment of the invention to be described hereinbelow in detail, the apparatus for repeatably and accurately mounting a probe assembly in a deep fat fryer uses a probe assembly of the type including a stiff sleeve formed of a smooth-surfaced metal containing a temperature sensing element at its end and arranged to be attached to the fryer and to be partly immersed in the cooking medium. The mounting apparatus comprises a mounting block arranged to be fixedly and permanently attached in a predetermined location on the fryer. The block has an opening, such as a sized slot, arranged to receive the probe sleeve and to thereby determine the position of the longitudinal axis of the sleeve in the cooking medium. Means are provided in the mounting block for gripping the probe sleeve in the opening, and means are provided for fixing the longitudinal position of the probe sleeve in the block opening, thereby to establish a constant position for the temperature sensing element immersed in the cooking medium. In one embodiment of the invention, the mounting block is fixedly attached to a fryer panel and has a vertical slot sized to receive the probe sleeve, the mounting block has detent means in the slot for releasably gripping the probe sleeve, and the probe sleeve has collars straddling the block for fixing the longitudinal position of the probe sleeve. This arrangement advantageously allows the probe sleeve to be easily snapped in and out for cleaning, repeatably positions the temperature sensing element in the same location in the cooking medium, permits the probe to rotate to relieve mounting stress, and allows standard straight probes to be used on different fryers. In another embodiment of the invention, the mounting block is secured to an electrical heating element of a fryer, and the probe is secured therein with a set screw and arranged to be removed from the cooking medium along with the heating element.

Further objects, advantages and aspects of the invention will be pointed out in, or apparent from, the detailed description hereinbelow, considered together with the following drawings.

DESCRIPTION OF THE DRAWINGS

FIG. 1 is a perspective view, essentially schematic, showing a deep fat fryer arranged to be governed by a timing computer with a temperature data input being supplied by a probe assembly mounted in accordance with the present invention;

FIG. 2 is a plan view, partially in section and with enlarged scale, of the probe mounting apparatus of FIG. 1;

FIG. 3 is an elevational view, partially in section, of the probe mounting apparatus of FIG. 2;

FIG. 4 is a sectional view, essentially schematic, showing a deep fat fryer of the type having a removable electrical heating element with a probe mounted in accordance with the present invention; and FIG. 5 is a plan view, partially in section and with enlarged scale, of the probe mounting apparatus of FIG. 4.

DESCRIPTION OF THE PREFERRED EMBODIMENT

Referring first to FIG. 1, a typical gas burner-heated deep fat fryer F1 is shown serviced by a cooking timing computer C having a start button S for starting the timing of a cooking cycle, and an indicator light L for indicating when the cycle is over. Cooking timing computer C is preferably of the well known type which continuously monitors the temperature of the cooking medium M in the fryer F as the temperature varies during a cooking cycle, and mathematically processes the temperature input data so as to integrate the temperature with respect to time to calculate when the desired degree of doneness is obtained. Examples of such timing computers are shown in U.S. patent application Ser. No. 51,629, filed July 1, 1970, of Allan E. Witt and George M. Suhm.

As shown in FIG. 1, timing computer C monitors the temperature of cooking medium M in fryer F by means of a probe P attached to the fryer with a mounting apparatus 10 constructed according to the present invention. The probe P is preferably similar to the type described in U.S. Pat. No. 3,866,472, comprising a tubular straight stainless steel sleeve 12 containing a temperature sensing element T at its lower end and connecting at its upper end 14 to a smaller diameter stainless steel tubular shell 16 which in turn is fastened to a connector socket 18 joining with computer C.

As will be explained below, the construction of probe mounting apparatus 10 enables the lower end of probe P containing temperature sensing element T to be accurately and repeatably positioned a uniform distance beneath the surface level SL of the cooking medium M and in a location midway between the sides of the tank, where the temperature of the cooking medium fluctuates along with the temperature of the cooking medium in contact with the product being cooked.

Referring now to FIGS. 2 and 3, the probe mounting apparatus 10 comprises a rectangular mounting block 20 of heat-resistant material, such as aluminum, which is permanently affixed to a fryer back panel 22 by means such as the illustrated screws 24 passing through panel 22 into threaded holes provided in mounting block 20.

The mounting block 20 has a vertical slot 26 provided along one side of the block 20. The slot 26 is dimensioned with a width W corresponding to the diameter of probe sleeve 12, and thus slot 26 receives the probe sleeve 12 and determines the position of the longitudinal axis of sleeve 12 in cooking medium M. In order to retain probe sleeve 12 in slot 26, confined against the back wall 28 of the slot in an upright position, mounting block 20 contains spring loaded ball detents 30 which extend into slot 26 to exert force upon the probe sleeve 12 to confine it against back wall 28 of the slot. The ball detents 30 preferably are provided in the form of known screw mounted units 32 which are inserted into threaded holes extending between the front face of mounting block 20 and slot 26. Such units permit the ball 30 to be accurately adjusted in slot 26 so as to provide the correct detaining force upon probe sleeve 12.

In order to fix the longitudinal position of probe sleeve 12 in slot 26 and thereby accurately position temperature sensing element T a uniform distance beneath the surface level SL of the cooking medium M, the probe sleeve 12 is provided with upper and lower collars 34 and 36 attached with set screws 38 and arranged to come into contact with the upper and lower faces of mounting block 20 and thereby straddle the block to insure that probe sleeve 12 will not move vertically.

The probe mounting apparatus 10 described above allows probe P to be easily removed from cooking medium M for cleaning, since sidewise finger pressure on probe sleeve 12 will overcome the resistance of ball detent 30 and enable the probe to be removed from slot 26. Remounting of the probe requires only that the probe sleeve be placed in slot 26 with collars 34, 36 straddling mounting block 20. Sidewise pressure sufficient to overcome the resistance of ball detents 30 will cause the probe sleeve to snap into place against the back wall 28 of slot 26, which will precisely locate the temperature sensing element T at the lower end of the probe in the desired location in cooking medium M. Accurate temperature data will then be transmitted to computer C and the product will continue to be cooked to the correct degree of doneness.

The mounting apparatus described above has several additional advantages not possessed by the prior art. Probe sleeve 12 is free to rotate in slot 26, and thus torsional stresses, which may be developed during attachment of the probe to computer C, are automatically relieved with a resultant increase in the longevity of probe P. In addition, mounting apparatus 10 allows probe P to be mass produced with a straight sleeve 12, while permitting the probe to be mounted in different fryers F merely by altering mounting block 20 so that the dimension L from the probe sleeve to the fryer mounting panel 22 is appropriate for the particular fryer to be used.

FIGS. 4 and 5 illustrate a probe mounting apparatus 50 designed for an electrically heated deep fat fryer F2 which, as shown, generally has a shallow tank and an electrical heating element E having a lower horizontal portion 52 immersed in the tank, a vertical portion 54 extending above the surface level SL of cooking medium M, and an upper portion 56 which leads to a pivoting mount 58 and enables the entire heating element E to be removed from cooking medium M for cleaning, as indicated by the dashed lines in FIG. 4.

Mounting apparatus 50 attaches a probe P to heating element E for removal therewith from the cooking medium. Mounting apparatus 50 comprises a mounting block 60 with a V-shaped end 62 arranged to contact the cylindrical vertical portion 54 of heating element E. The mounting block 60 is attached to the heating element by means of metal straps or brackets 64, 66 fastened on opposite sides of mounting block 60 with a through bolt 68, and fastened together around heating element portion 54 with another bolt 70.

Mounting block 60 has a vertical hole 72 therethrough with a diameter matching the diameter of probe sleeve 12, thereby to accurately locate the longitudinal axis of the sleeve. A set screw 74 mounted in block 12 grips the probe sleeve in vertical hole 72. The set screw 74 may be positioned, as shown in FIG. 5, to be adjustable from the v-shaped end 62 which contacts heating element portion 54. The probe P has its longitudinal position fixed in relation to block 60 by means of a collar 76, similar to collars 34 and 36, attached to probe sleeve 12 and designed to contact the top surface of block 60. Alternatively, the vertical position of the probe may be accurately determined in relation to block 60 by establishing a visual reference on the probe, such as the top of the stiff sleeve 12, and by aligning the visual reference with the top surface of block 60, or another selected matching point.

Mounting apparatus 50 provides a means by which a probe P can be mounted in an electrical deep fat fryer in a predetermined location in the cooking medium, and can be repeatedly removed and replaced in the course of cleaning, while accurately and repeatedly positioning the temperature sensing element T in the same location in the cooking medium M to supply uniform and accurate temperature data to a cooking computer. The mounting apparatus enables standard straight probes to be used, and these advantages are achieved in a structure whose construction is neither unduly expensive nor complicated.

Although a specific embodiment of the invention has been disclosed herein in detail, it is to be understood that this is for the purpose of illustrating the invention and should not be construed as necessarily limiting the scope of the invention, since it is apparent that many changes can be made to the disclosed structures by those skilled in the art to suit particular applications. For example, the open vertical slot 26 and ball detents 30 of mounting apparatus 10 could be employed in mounting apparatus 50 for use on an electric fryer.

I claim:

1. An apparatus for repeatably and accurately mounting a probe assembly in a deep fat fryer wherein the length of cooking time is to be calculated by a timing computer responsive to the temperature in a predetermined location in the cooking medium, the probe assembly being of the type including a straight stiff sleeve formed of a smooth-surfaced metal containing a temperature sensing element at its end and arranged to be attached to the fryer and to be partly immersed in the cooking medium, said mounting apparatus comprising:
   a mounting block arranged to be fixedly attached in a predetermined location on the fryer;
   said block having an opening therein arranged to receive the probe sleeve and to determine the position of the longitudinal axis of the sleeve in the cooking medium;
   means in the block for gripping the probe sleeve in the opening therein; and
   means for fixing the longitudinal position of the probe sleeve in the block opening, thereby to establish a constant position for the temperature sensing element immersed in the cooking medium;
   whereby the end of the sleeve may be accurately and repeatedly positioned in said predetermined location in the cooking medium to provide uniform temperature data input to said computer despite repeated removal of said sleeve from the fryer for cleaning.

2. A mounting apparatus as claimed in claim 1 wherein the opening in said block is a slot arranged to receive the probe sleeve.

3. A mounting apparatus as claimed in claim 2 wherein the means for gripping the probe sleeve comprises detent means arranged to releasably hold the probe sleeve in said slot.

4. A mounting apparatus as claimed in claim 1 wherein the means in the block for gripping the probe sleeve in the opening therein comprises detent means arranged to releasably hold the probe sleeve in said opening.

5. A mounting apparatus as claimed in claim 3 wherein the means for fixing the longitudinal position of the probe sleeve in the block opening comprises collar means on the probe sleeve arranged to contact the block and thereby limit movement of the probe sleeve in said opening.

6. A mounting apparatus as claimed in claim 5 wherein said collar means comprises a pair of collars mounted on the probe sleeve and arranged to be positioned on opposite sides of the block as the probe sleeve is inserted into said slot.

7. A mounting apparatus as claimed in claim 1 wherein the opening in said block is a slot along one side of the block, the means for gripping the probe sleeve comprises spring loaded ball detent means in the slot for releasably holding the probe sleeve therein, and the means for fixing the longitudinal position of the probe sleeve comprises collar means on the probe sleeve arranged to contact the block to limit longitudinal motion of the sleeve in the slot, whereby the mounting apparatus permits the probe sleeve to rotate to relieve torsional stress and permits the probe sleeve to be easily disconnected for cleaning and reconnected for use.

8. A mounting apparatus as claimed in claim 1 wherein said opening in the block comprises a hole therein receiving the probe sleeve.

9. A mounting apparatus as claimed in claim 1 wherein the means for gripping the probe sleeve in the opening comprises set screw means arranged to contact the probe sleeve.

10. A mounting apparatus as claimed in claim 1 wherein the means for fixing the longitudinal position of the probe sleeve comprises means on the probe and block for aligning the probe sleeve longitudinally relative to the block.

11. A mounting apparatus as claimed in claim 10 wherein the probe sleeve is provided with its upper end located in a position to be aligned with the top of the block to thereby fix the longitudinal position of the probe sleeve in the block.

12. A mounting apparatus as claimed in claim 1 wherein the deep fat fryer is of the type having a removable electrical heating element, and wherein said mounting block is arranged to be fixedly attached to said electrical heating element for removal therewith.

* * * * *